Figure 1:
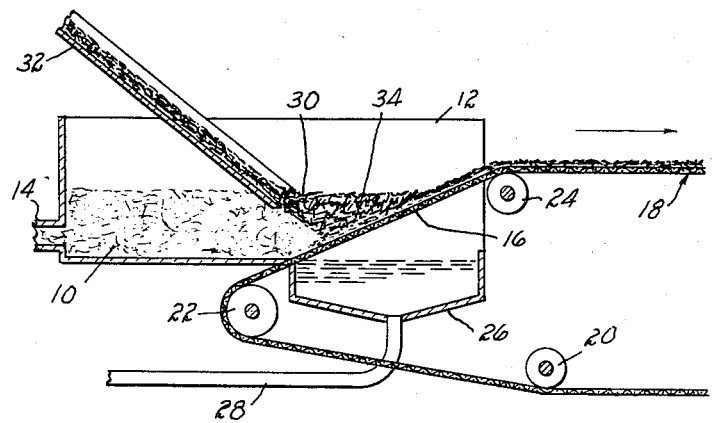

March 15, 1960          H. L. KURJAN          2,928,765
AIR FILTER PAPER AND METHOD OF MAKING SAME
Filed Feb. 11, 1957

INVENTOR.
HOMER L. KURJAN
BY
*Lindsey and Prutzman*
ATTORNEYS

United States Patent Office 2,928,765
Patented Mar. 15, 1960

2,928,765

AIR FILTER PAPER AND METHOD OF MAKING SAME

Homer L. Kurjan, Windsor, Conn., assignor to C. H. Dexter & Sons, Inc., Windsor Locks, Conn., a corporation of Connecticut Application February 11, 1957, Serial No. 639,452

19 Claims. (Cl. 162—129)

The present invention relates generally to air filter mediums and is directed, more particularly, to a novel paper having improved and unique properties for use as an air filtering medium such as in air filters for the air intake of internal combustion engines.

While the paper of the present invention is not limited to use in air filters for internal combustion engines, this use will be particulaly described herein because it emphasizes the problems encountered in providing a suitable air filtering medium and the unique characteristics afforded by the paper of the present invention.

It has long been recognized that it is desirable to filter the air intake of internal combustion engines to remove dust and other foreign particles prior to carburation, etc. The usual practice heretofore has been to utilize air filters of the oil bath type despite the fact that such filters are bulky and require considerable space for installation, they are messy and inconvenient to service, and they must be operated in an upright position to avoid spillage or leakage. It has been proposed heretofore to use other types of filters, but no commercially acceptable substitute has been found prior to the present invention which will meet the stringent requirements of this specific use. For example, an air filtering medium for use with internal combustion engines must have a high degree of permeability in order that within reasonable size limitations it will admit a high volume of air (of the order of 100 cubic feet per minute) without undesirable pressure drop and at the same time it must accomplish a satisfactory filtering and cleaning action and yet not become so rapidly plugged up with foreign matter removed from the air so that it will have a short service life necessitating frequent replacement.

The aim of the present invention is to provide a paper sheet which can be mass produced economically, uniformly, and in large quantity by a paper making process and which will have the characteristics required for practical air filtering use including the characteristics enumerated above for use as an air filtering medium in air filters for internal combustion engines. A more specific aim is to provide a paper sheet suitable for fabrication into air filter cartridges for use in air filters for internal combustion engines which provides effective air cleaning combined with a reasonable service life and without causing undesirable effects upon the air intake characteristics of the engine.

Figure 2:
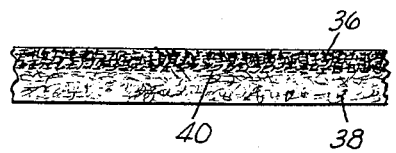

Other objects and aims of the invention will be pointed out or apparent in the following description taken in connection with the accompanying drawing in which:

Fig. 1 is a diagrammatic view of the head box end of a paper making machine which may be utilized in the practice of the method of the present invention, the view being a side elevation in section; and Fig. 2 is an enlarged section of the novel air filter paper of the present invention.

In accordance with the invention, a paper sheet having unique air filtering characteristics is prepared by forming a sheet of multiphase construction and relatively large bulk in which the minor phase consists essentially of ordinary paper making fibers and the major phase consists essentially of redwood bark fiber. In the use of the paper as an air filter medium, the air is allowed to pass transversely through the paper with the redwood bark fiber layer facing the air inlet.

The use of redwood bark fiber in a paper making process is believed to be unique in the present invention. Cleaned redwood bark fibers, by which is meant fibers substantially free of cork and similar constituents of the bark, are available commercially for other purposes. Such fibers generally have a fiber length in the range of ¼ to ⅜ inch although some may run as high as ½ inch in length and they are generally referred to as a coarse fiber in that the diameter usually falls in the range of 50 to 80 microns. These fibers are generally cylindrical in cross-section and, possibly become of a high lignin content, the fibers are very stiff.

Redwood bark fiber is made into a base sheet in accordance with the invention by forming a dilute slurry thereof in water and permitting the fibers to deposit out on the Fourdrinier wire of a paper making machine. The natural fibers as such will felt out into a self sustaining sheet, but it is preferred to first cook the fibers slightly in alkali solution to increase the softness and felting properties for optimum results. No beating nor any binder is required. In a typical cooking step, the redwood bark fibers are placed in a 0.5 to 1% sodium hydroxide solution and cooked for approximately two hours under steam pressure of the order of 75 pounds.

After the cooking operation, if this step is used, the fibers are made up into a slurry comprising approximately ¾ to 3% fiber and preferably about 1½% fiber, the remainder being water. This aqueous slurry is then introduced into the head box of a paper making machine along with a large quantity of water to form a very dilute suspension. The amount of water added is approximately 60 to 1. The paper making machine, as illustrated in Fig. 1 of the drawings, is preferably of the type shown and described in the prior Osborne Patent No. 2,414,833, dated January 28, 1947. Referring to Fig. 1 of the drawings, the dilute redwood bark fiber slurry indicated at 10 enters the head box 12 through the inlet 14 and flows toward the inclined portion 16 of the traveling Fourdrinier wire 18. The Fourdrinier wire passes under idler roll 20 around the breast roll 22 and then over the idler roll 24 moving continuously in the direction of the arrow. As the redwood bark fiber meets the wire screen at 16, the suspended redwood bark fibers are deposited on the wire screen and the liquid passes through the screen to the save-all 26 from which it is removed through pipe 28 for reuse. The machine is operated at a speed to produce a base sheet preferably having a weight of 65 to 95 pounds although this is not critical and depends upon the filtering characteristics desired. Sheet weights in pounds when stated herein refer to the weight in pounds of 2880 sq. ft. of the paper (one ream).

In accordance with the invention, there is also introduced into the head box 12 at the place indicated by the reference numeral 30, such as by means of an inclined trough 32, a second slurry 34 comprising a dilute suspension (approximately .05 to 2%) of ordinary paper making fibers, plus additional water in the proportion of about 20 to 30 parts of water to one part of slurry. By introducing the slurry of ordinary paper making fibers in this manner, the slurry 34 encounters the inclined Fourdrinier wire portion 16 subsequent to the deposit of the redwood bark fibers so that substantially distinct layers are formed and yet since the sheet is not fully formed at this point there is caused an intermingling of the fibers at the interface resulting in a strong and coherent single sheet. The amount and dilution of the slurry of ordinary paper making fibers is such that these fibers comprise a minor proportion of the final sheet, the optimum being about one-third ordinary paper making fibers to about two-thirds redwood bark fiber. In the specific example given where the base sheet has a weight of 65 to 95 pounds the top sheet thus preferably has a weight of approximately 20 to 30 pounds, making a total sheet having a weight of 85 to 125 pounds.

After the composite sheet is formed on the Fourdrinier wire as described, it continues on to be couched and dried in the usual paper making procedure. Fig. 2 of the drawing illustrates the dry sheet as it comes from the paper making machine with the ordinary paper making fibers 36 forming the minor phase upper layer of the sheet and the redwood bark fibers 38 forming the major phase lower layer, the layers being intermixed and felted together at the interface 40. In the preferred embodiment, the multiphase sheet has a gage of approximately .025 to .035 inch and a density in the range of approximately .20 to .25.

The term "ordinary paper making fibers" is used herein to designate natural and synthetic fibers which are used in conventional paper making processes. Such fibers are preferably of shorter length than the redwood bark fibers and are capable of felting together without the use of binders although binders may be added if desired. A beating step may be employed to improve felting if desired although this generally is not essential. Optimum results are obtained by using fibers which are ordinarily used to form low density papers such as alpha pulp fibers, hemp, cotton linters, cut rayon, and the like. In the preferred embodiment, an appoximately equal mixture of short cotton linters and cut rayon is utilized.

When the final sheet is to be used for fabricating air filter cartridges for use with internal combustion engines, the sheet after it comes from the drying operation is preferably impregnated with an uncured resin as well as with flame retardant and water repellent materials. It is an advantage of the invention that this can be done without appreciably reducing the desired air filtering properties of the sheet. Among the uncured resins which may be used may be mentioned phenolic resins, melamine, urea resins, and the like. The purpose of adding the uncured resin is so that after the sheet is formed into a cartridge such as by pleating, the form may be set by curing the resin with heat. Among the flame retardant materials which may be used, typical examples are ammonium compounds, such as ammonium phosphates and sulfamates. A preferred water repellent material is a silicone such as Dow-Corning No. 1107.

The uncured resin and flame retardant and water repellent materials, if they are added, may be applied together or separately in any suitable manner such as by roller application, spraying or dipping. In general, roller application is preferred. The amount of these materials added within reason is not critical. The desired or optimum results usually can be obtained by forming a final sheet in which the resin and other additives amount to approximately 15 to 35% of the final weight with the resin being approximately one-half of this amount.

When the air filter paper of the present invention is made up into air filter cartridges, it is found to have remarkable air cleaning ability together with a long service life and high air permeability. Extensive testing has shown that air cleaning of the order of 98% can be obtained which is considerably better than that obtainable with conventional air filters of the oil bath type. The permeability is of the order of 120 to 250 cubic feet of air per minute per square foot of area with a back pressure of only ½ inch of water. The capacity of the filter for dirt removal is of the order of 30 to 35 grams per square foot which represents a service life in ordinary usage of approximately one year. This can be extended, if desired, by shaking out the dirt which has settled out in the filter.

As previously mentioned, the filter paper is used with the redwood bark fiber layer on the outside or facing the air inlet. While it is not desired to limit the invention to a specific theory of operation, nonetheless it appears that the redwood bark fiber layer, probably because of the unusual physical characteristics of this fiber, has a unique coarse and loose structure in depth which effectively filters out dust particles from the air and can hold or retain the dust particles in large quantity without becoming clogged and losing its permeability. The looseness of the structure can be illustrated by the ease with which the accumulated dust can be shaken out from the filter. The layer of ordinary paper making fibers gives added strength to the sheet and performs the final filtering action although because most of the dust is removed in the redwood bark fiber layer, it, too, does not rapidly become clogged. As a result, effective cleaning of the air is obtained together with long service life and high permeability.

In order that the invention may be fully understood, the following are given by way of specific example but without limitation of the invention thereto:

*Example I*

In this example, commercial redwood bark fiber was preliminarily cooked in a 0.8% NaOH solution under 75 pounds steam pressure for two hours. 280 pounds of this cooked fiber was then suspended in approximately 2400 gallons of water to make up a slurry containing approximately 1½% fiber which was introduced into the head box of the machine of Fig. 1 along with sufficient water to dilute the initial slurry approximately 60 times. The slurry introduced through the trough was composed of 65 pounds of 3 denier $\frac{3}{16}$ inch rayon and 135 pounds of cotton linters initially mixed in 1600 gallons of water to form a 1½% fiber slurry and then further diluted approximately 30 times. The multiphase sheet as it came from the machine had a weight varying from 90.8 to 114.8 pounds and was composed of redwood bark fibers in the proportion of about three to one. The gage of the sheet averaged approximately .031 inch and the density averaged approximately .21. When subjected to air flow tests, the paper had an average permeability of 120 cubic feet per minute per square foot under a pressure of ½ inch of water. Effectiveness for dust removal was 98% and the sheet was able to retain 32 grams of dust per square foot without clogging.

A portion of the multiphase sheet thus prepared was then saturated with a solution of phenolic resin so that the sheet after subsequent curing had a resin content of approximately 10%. As a result of this treatment, the weight increased to an average of 105.6 pounds and the average gage increased to .035 inch. The air flow test was repeated and it was found that permeability was reduced to 96 cubic feet per minute. Air cleaning ability and dust retention was undiminished.

*Example II*

In this example, a slurry of cooked redwood bark fiber was prepared as in Example I, but the slurry for forming the top layer was composed of 200 pounds of alpha soft wood fiber and 50 pounds hemp in 2000 gallons of water which was diluted at the head box to a fiber content of approximately .0075%. A multiphase sheet having an average weight of 89 pounds was formed in which the ratio of redwood bark fiber was approximately nine to one. The gage of the final sheet averaged .03 inch and the density averaged 0.2. When subjected to the air flow test of Example I, the permeability was found to be 140 cubic feet per minute. Dust removal was found to be 98% and dust retention without clogging averaged 30 grams per square foot. Portions of the sheet were treated with flame retardant and water repellent materials without material change in air filtering characteristics.

While the invention has been described by way of specific examples, it will be understood that variations will be apparent to one skilled in the art and all such variations are intended to be included within the scope of the invention.

I claim:

1. A method of forming a water-laid highly permeable multiphase paper sheet suitable for use as an air filtering medium comprising the steps of flowing a dilute slurry of unbeaten redwood bark fibers onto a traveling wire screen to form a base layer of such fibers, immediately thereafter flowing a dilute slurry of ordinary paper making fibers over the redwood bark fibers to form a cohesive top layer of the paper making fibers, and drying the resulting web while maintaining the web in uncompacted form to produce a flexible self-sustaining sheet having relatively loose redwood bark fibers on one side and a paper bonding layer on the other.

2. A method as set forth in claim 1 wherein the proportion by weight of redwood bark fibers is greater than the proportion by weight of ordinary paper making fibers.

3. A method as set forth in claim 1 wherein the total weight of redwood bark fibers is approximately three times the total weight of the ordinary paper making fibers.

4. A method of forming a water-laid highly permeable multiphase paper sheet suitable for use as an air filtering medium comprising the steps of flowing an aqueous slurry containing .0125 to .05% of unbeaten redwood bark fiber the major proportion of which has a fiber length of ¼ to ½ inch onto a traveling wire screen to deposit a base layer of redwood bark fibers thereon, thereafter flowing a dilute aqueous slurry containing ordinary paper making fibers over the redwood bark fibers to form an upper layer of paper making fibers, and drying the resulting web while maintaining the web in uncompacted form to produce a flexible self-sustaining sheet having relatively loose redwood bark fibers on one side and a paper bonding layer on the other.

5. A method of forming a water-laid highly permeable multiphase flexible paper sheet suitable for fabrication into air filter cartridges comprising the steps of flowing a dilute slurry of unbeaten redwood bark fibers and a dilute slurry of ordinary paper making fibers in sequence onto a traveling wire screen to form a multiphase sheet, drying the sheet while maintaining the sheet in uncompacted form, and thereafter impregnating the sheet with a solution of uncured resin.

6. The method of claim 5 wherein the uncured resin is phenolic resin.

7. A method of forming a water-laid highly permeable multiphase flexible paper sheet suitable for fabrication into air filter cartridges comprising the steps of flowing a dilute slurry of unbeaten redwood bark fibers and a dilute slurry of ordinary paper making fibers in sequence onto a traveling wire screen to form a multiphase paper sheet, drying the sheet while maintaining the sheet in uncompacted form, and thereafter impregnating the sheet with a flame retardant material.

8. A method of forming a water-laid highly permeable multiphase flexible paper sheet suitable for fabrication into air filter cartridges comprising the steps of flowing a dilute slurry of unbeaten redwood bark fibers and a dilute slurry of ordinary paper making fibers in sequence onto a traveling wire screen to form a multiphase paper sheet, drying the sheet while maintaining the sheet in uncompacted form, and thereafter impregnating the sheet with a water repellent material.

9. A method of forming a water-laid highly permeable multiphase flexible paper sheet suitable for fabrication into air filter cartridges comprising the steps of flowing a dilute slurry of unbeaten redwood bark fibers and a dilute slurry of ordinary paper making fibers in sequence onto a traveling wire screen to form a multiphase paper sheet, drying the sheet while maintaining the sheet in uncompacted form, and thereafter impregnating the sheet with a solution containing uncured resin, a flame retardant material, and a water repellent material.

10. A highly permeable and flexible fibrous sheet for use as an air filtering medium comprising a multiphase sheet having one layer consisting essentially of ordinary paper making fibers in a form sustaining sheet and a second layer consisting essentially of relatively loose unbeaten redwood bark fibers, supported by the first layer and forming interstices for separating and retaining dust from air passing through the sheet.

11. A highly permeable and flexible fibrous sheet for use as an air filtering medium comprising a multiphase water-laid sheet having a minor layer consisting essentially of ordinary paper making fibers in a form sustaining sheet and a major layer consisting essentially of relatively loose unbeaten redwood bark fibers supported by the first layer and forming interstices for separating and retaining dust from air passing through the sheet.

12. A highly permeable fibrous sheet as defined in claim 11 wherein the proportion of paper making fibers to redwood bark fibers by weight is approximately one to three.

13. A highly permeable fibrous sheet as defined in claim 11 wherein the layer of paper making fibers has a weight of approximately 20 to 30 pounds per ream and the layer of redwood bark fibers has a weight of approximately 65 to 95 pounds per ream.

14. A highly permeable and flexible fibrous sheet for fabrication into air filter cartridges comprising a multiphase water-laid sheet having a minor layer consisting essentially of ordinary paper making fibers in a form sustaining sheet and a major outer layer supported thereby consisting essentially of relatively loose and unbeaten redwood bark fibers, said sheet being impregnated with an uncured resin.

15. A highly permeable and flexible fibrous sheet for fabrication into air filter cartridges comprising a multiphase water-laid sheet having a minor layer consisting essentially of ordinary paper making fibers in a form sustaining sheet and a major layer supported thereby consisting essentially of relatively loose and unbeaten redwood bark fibers, said sheet being impregnated with an uncured phenolic type resin.

16. A highly permeable and flexible fibrous sheet for fabrication into air filter cartridges comprising a multiphase water-laid sheet having a minor layer consisting essentially of ordinary paper making fibers in a form sustaining sheet and a major layer consisting essentially of relatively loose and unbeaten redwood bark fibers, said sheet being impregnated with a flame retardant material.

17. A highly permeable and flexible fibrous sheet for fabrication into air filter cartridges comprising a multiphase water-laid sheet having a minor layer consisting essentially of ordinary paper making fibers in a form sustaining sheet and a major layer consisting essentially of relatively loose and unbeaten redwood bark fibers, said sheet being impregnated with a water repellent material.

18. A highly permeable and flexible fibrous sheet for fabrication into air filter cartridges comprising a multiphase water-laid sheet having a minor layer consisting essentially of ordinary paper making fibers in a form sustaining sheet and a major layer consisting essentially of relatively loose and unbeaten redwood bark fibers, said sheet being impregnated with an uncured resin, a flame retardant material, and a water repellent material.

19. A fibrous sheet as defined in claim 18 wherein the total weight of uncured resin, flame retardant material and water repellent material comprises from 15 to 35% of the weight of the total sheet.

References Cited in the file of this patent

UNITED STATES PATENTS

| | | |
|---|---|---|
| 1,349,112 | Weiss | Aug. 10, 1920 |
| 1,468,036 | Shaw | Sept. 18, 1923 |
| 1,828,028 | Darling | Oct. 20, 1931 |
| 1,860,097 | Hoggatt | May 24, 1932 |
| 2,098,733 | Sale | Nov. 9, 1937 |
| 2,108,231 | Nash | Feb. 15, 1938 |
| 2,414,833 | Osborne | Jan. 28, 1947 |
| 2,531,504 | Dillehay et al. | Nov. 28, 1950 |
| 2,664,964 | Asplund | Jan. 5, 1954 |
| 2,683,400 | Booth et al. | July 13, 1954 |